(12) United States Patent
Portney (10) Patent No.: US 10,261,343 B2
(45) Date of Patent: Apr. 16, 2019

(54) FRAME INDEPENDENT FOCUS ADJUSTABLE EYEWEAR LENS

(71) Applicant: Valdemar Portney, Newport Coast, CA (US)

(72) Inventor: Valdemar Portney, Newport Coast, CA (US)

(*) Notice: Subject to any disclaimer, the term of this patent is extended or adjusted under 35 U.S.C. 154(b) by 0 days.

(21) Appl. No.: 15/852,627

(22) Filed: Dec. 22, 2017

(65) Prior Publication Data

US 2018/0188556 A1    Jul. 5, 2018

Related U.S. Application Data

(60) Provisional application No. 62/440,373, filed on Dec. 29, 2016.

(51) Int. Cl.
*G02C 7/06* (2006.01)

(52) U.S. Cl.
CPC ........... *G02C 7/06* (2013.01); *G02C 2202/12* (2013.01)

(58) Field of Classification Search
USPC .............. 351/41, 159.01, 159.41, 159.43
See application file for complete search history.

(56) References Cited

U.S. PATENT DOCUMENTS

| | | | |
|---|---|---|---|
| 4,190,330 A | 2/1980 | Berreman | |
| 4,300,818 A * | 11/1981 | Schachar | A61B 3/103 349/13 |
| 4,373,218 A | 2/1983 | Schachar | |
| 5,128,494 A | 7/1992 | Blum | |
| 5,526,067 A | 6/1996 | Cronin et al. | |
| 5,684,637 A | 11/1997 | Floyd | |
| 5,999,328 A | 12/1999 | Kurtin et al. | |
| 6,715,876 B2 | 4/2004 | Floyd | |
| 7,008,054 B1 | 3/2006 | Kurtin et al. | |
| 7,009,757 B2 | 3/2006 | Nishioka et al. | |
| 7,475,984 B2 | 1/2009 | Blum et al. | |
| 7,866,816 B2 | 1/2011 | Kurtin | |

(Continued)

OTHER PUBLICATIONS

Li G, Mathine D L, Valley P, et al., "Switchable electro-optic diffractive lens with high efficiency for ophthalmic application", Proceedings of the National Academy of Science of the USA, 2006; 103: 6100-6104.

*Primary Examiner* — Tuyen Tra
(74) *Attorney, Agent, or Firm* — Hackler Daghighian Martino & Novak (57) ABSTRACT

A frame independent focus adjustable eyewear lens blank includes an autonomous components assembly. The lens blank includes a front optically finished convex surface and a back unfinished surface. A first and second space are formed in the lens blank between the front and back surfaces. The autonomous components assembly includes a focus sensor configured to detect a need for near and/or far focus and a control electronics having a microprocessor and a power unit. The power unit includes a battery and/or a photocell. The lens blank includes a focus adjustable element configured to change a focus viewed through lens produced from the lens blank where the focus adjustable element is in communication with the focus sensor and the control electronics. The focus sensor, control electronics and power unit are disposed within the first space and the focus adjustable element is disposed within the second space.

20 Claims, 3 Drawing Sheets

(56) References Cited

U.S. PATENT DOCUMENTS

| | | |
|---|---|---|
| 7,971,994 B2 | 7/2011 | Blum et al. |
| 8,002,403 B2 | 8/2011 | Silver et al. |
| 8,408,699 B2 | 4/2013 | Blum et al. |
| 8,608,800 B2 | 12/2013 | Portney |
| 9,364,319 B2 | 6/2016 | Portney |
| 9,778,489 B2 | 10/2017 | Blum et al. |

* cited by examiner

FRAME INDEPENDENT FOCUS ADJUSTABLE EYEWEAR LENS

CROSS-REFERENCE TO RELATED APPLICATIONS

This application claims priority from U.S. Provisional Patent Application Ser. No. 62/440,373 filed on Dec. 29, 2016, the entire contents of which are fully incorporated herein with these reference.

FIELD OF THE INVENTION

The present invention relates generally to design and manufacturing of a frame independent focus adjustable spectacle lens that produces images of objects located at different distances from the lens and more specifically to a frame independent switchable spectacle lens that creates an image at a position produced by the lens in a diffractive state that is different from the image position produced by the lens in a refractive state and even more specifically to a frame independent switchable spectacle lens that changes image positions by switching between refractive and diffraction surface shapes of far and near foci or intermediate and near foci correspondently for presbyopia correction.

Background of the Invention

A fixed single power lens provides good quality vision but only within a small range of viewing distances that is usually significantly narrower than the range required from near to far vision. The resulted vision deficiency is called presbyopia. In eyewear, the common approach to a presbyopia correction is via a progressive optic where the lens manifests stationary power contour that includes areas of optical powers for far and near. There is a significant effort to develop an eyewear lens for presbyopia correction in a form of dynamic lens (also called focus adjustable lens) where the lens optical focus changes within certain lens area according to the spectacles wearer vision need.

It is a common practice in the eyewear market that the spectacles wearer selects an eyewear based largely on fashion and aesthetics for comfort and appearance. As a result, the frames are usually selected first and lenses, including optical design for the prescription, tints, and coatings are determined second. The dispensing practice historically was established for lenses with static lens (static lens optical design can not be modified, i.e. optical power map of a static lens is preset prior to the lens framing) but with the development of a dynamic lens, "first frame" procedure has become a challenge due to the presence of additional components such as focus sensor, control electronics and power source in addition to the lens optic itself which are commonly placed within or connected to the spectacle frame. Thus, in order to segregate spectacle frame fashion and aesthetics from eyewear lens, the lens must be frame independent which is a challenge with dynamic lenses.

Other important challenges in dispensing dynamic lenses are cost and turn around time in providing eyewear to a spectacle wearer. The optical industry has developed certain processes of eyewear fabrication and dispensing of static lens (optic), and has undertaken a significant investment into optical labs and shops to accommodate such processes. It would be highly desirable to maintain already established processes for static optic for dynamic lens (optic) in order to meet the cost and turn around challenges.

The form of a given lens is determined by "base curve selection" as the most common step of eyewear static lens design. The base curve of a spectacle lens is usually front surface curve that serves as the starting point in determining back surface shape for individual refractive prescription. For so called lens blank which is the semi-finished lens blanks, the base curve is the factory-finished curve and an optical lab or shop locally shapes the posterior surface per the prescription thus providing very expedient eyewear dispensing—a wearer may even receive the spectacles in 24 hours.

Manufacturers typically produce a series of lens blanks, each with its own base curve depending of the material used. This "base curve series" (e.g., +0.50 D, +2.00 D, +4.00 D, and so on) is manifested by a set of lens blanks where each base curve in the series is used for producing a small range of prescriptions by an optic lab or shop per manufacturers base curve selection charts that provide the recommended prescription range for each base curve in the series.

Before lens framing, the finished lens is coated per individual wearer request which is also handled by the optic lab or shop. The coating may include different layers such an impact-resistant coating; a hard coating, which protects the lens from scratches; anti-reflecting coating; a hydrophobic coating for water-repellent and easier lens cleaning; photochromic coating to control lens transmittance with light intensity or tint for a certain stationary transmittance of the lens.

Thus, historically such separation of manufacturing functions in eyewear dispensing between the manufacturers and optic labs has been established for a cost effectiveness, attention to the individual wearer need and desire, as well as for expediency of the eyewear dispensing. Finishing the spectacle lens per a prescription and handling different coatings by a manufacturer is likely more costly for a spectacle wearer and most likely leading to a longer turn around time in providing the spectacles to the wearer.

A frame independent lens is likely limited to a design with a single lens (the lens may consists of multiple stacked together optical components) to follow the historical spectacles configurations of a static lens. A dynamic eyewear lens consisted of a single lens can be of different designs generally divided into two categories—surface based focus adjustable design where the surface shape varies for the optical power change, and material based focus adjustable design where material refractive index is altered for the optical power change. Each focus adjustable design category can also be of two types—variable focus where the optical power continually varies from one power level to another in an analog fashion and switchable focus where the optical power switches between different power levels in a digital fashion.

Variable focus lenses of various designs have been disclosed. For example, U.S. Pat. Nos. 4,190,330; 4,373,218; 4,190,330 and others disclose liquid crystal devices with focus variation resulted by the material refractive index change controlled by electric or magnetic field and are incorporated in full with these references. Such variable focus lens designs fall under material based focus adjustment category.

Different fluid filled lens designs with variable focus have been proposed over the years. They can be divided into two forms. The first form is the fluidic lens having a fixed volume of fluid supported by an elastic membrane at least at one surface. They have been described in U.S. Pat. Nos. 5,138,494; 5,526,067; 5,999,328 and others and are incorporated in full with these references. By changing circumference size of the elastic membrane, the fluid inside the fluidic lens is redistributed to change a curvature of the lens surface supported by the elastic membrane. The second form of fluidic lens involves a pumping of fluid in or out the lens chamber to change the curvature of the lens surface supported by the elastic membrane as described in U.S. Pat. Nos. 5,684,637; 6,715,876 and others and are which incorporated in full with these references. Both design forms of variable focus lenses fall under the surface based focus adjustable category.

Switching between the powers in a digital fashion involves switching between refractive and diffractive optical states. The material based switchable lens was first described by a group of researches: Li G, Mathine D L, Valley P, et al. "Switchable electro-optic diffractive lens with high efficiency for ophthalmic application", Proceedings of the National Academy of Science of the USA, 2006; 103: 6100-6104, in the application to the spectacle lens. The switching operation described by Li G, et al was based on electrical control of the refractive index of thin layer of pneumatic liquid crystal by creating a volume diffractive element through refractive index modulation by the electric field for the diffractive state of about 85% diffractive efficiency and the refractive state with the absence of an electric field.

Portney's U.S. Pat. No. 9,364,319 disclosed the surface based switchable optic that switches between the refractive and diffractive states of different optical powers and which is fully incorporated herein with this reference. Its design relies on optical fluid transfer to fill the space between the elastic membrane and diffraction surface of optical substrate. The elastic membrane takes smooth refractive shape when the space is filled with optical which also masks the diffractive surface of the substrate because its refractive index matches the refractive index of the optical substrate. It results in the refractive state of certain optical power. The diffractive state is created when the optical fluid is transported from the space between the elastic membrane and optical substrate forcing the membrane to largely conform to the diffraction surface shape of the optical substrate. This results in the diffractive state of certain power defined by the diffractive surface of the substrate.

Surface based switchable lens offers single focus performance in the refractive state equivalent to a conventions static lens. A performance in the diffractive state is about 85% diffractive efficiency as the elastic film can't fully take the shape of the substrate's diffractive surface and with the presence of possible diffractive groove ridge truncations for the membrane bonding to the substrate at the groove ridges. Such truncations can be of a shape that is not parallel to the base surface of the substrate's diffractive surface. For instance, each truncation might be a concave shape to extensively spread the light passing through the transaction over a large area thus reducing an effect of out-of-focus on the image quality in the diffractive state.

Designs of spectacles with focus adjustable lenses commonly place components such as focus sensor, control electronics and power source within the spectacle frame thus making the eyewear lens frame dependent. For instance, one is referred to U.S. Pat. Nos. 7,008,054; 7,009,757; 7,475,984; 7,866,816; 8,002,403 and others and which are incorporated in full with these references.

Blum's U.S. Pat. No. 8,408,699 recognizes the importance of lens frame independence in the example of electro-active spectacle lens, which is incorporated in full with this reference. The U.S. Pat. No. 8,408,699 disclosed an adapter attached to the back of the eyewear lens to operate and control electro-active lenses housed in the frame. The U.S. Pat. No. 8,408,699 also disclosed that the focus sensors can be imbedded within the lens body with control electronics may be attached to the anterior and/or posterior surface of the substrate where electrical connection is made via electrical lead. The U.S. Pat. No. 8,408,699 also disclosed that the power source, focus sensors and control electronics can be placed near the edge of the lens close to temple as alternative to the placement within the adapter but without providing any specifics.

The disclosed in U.S. Pat. No. 8,408,699 specifications have made advance towards lens frame independence but it is still manifested limitations particularly in its ability to follow the commonly adopted by the optical industry eyewear dispensing processes. Blum's central disclosure related to the adapter but the adapter arrangement limited a frame selection because it required a space between the head's temple and frame temple (side arms), i.e. the end pieces (lugs) of the frame must be protruded out enough to make a space for the adapter. Blum only cursorily mentioned about electro-active components placement on the front or back surfaces of the lens. Such arrangement would interfere with a common process of lens finishing per the prescription by the optical lab. For instance, the lens finish is performed with back surface surfacing and lens blocking at the front surface thus likely interfering with electro-active components placed on the a surface. In addition, electro-optic components attached to a lens surface might be damaged with the lens coating. Also, the whole question of fashion and esthetics which is the underlying objective of the lens frame independence in the first place, is likely jeopardized with the electro-active components sticking out at different locations from a lens surface.

Thus, there is still unresolved issues with dynamic lens frame independence that meets the desire of the spectacles wearer to maintain a flexibility and fashion with a frame selection as well as the issue to follow dynamic lens dispensing process that closely resembles the historically established eyewear dispensing processes developed for static lenses.

There is also another fundamental issue which has not been addressed by the prior art, which is the effective remote communication with eyewear lens autonomous components, i.e. components that are not evolved frame structure for communication, for instance, for a calibration/performance adjustment of a focus sensor embedded in the lens. Blum in U.S. Pat. No. 9,778,489 disclosed a focus sensor that receives the reflected signal off the object which is placed in one or more positions on the front of the lens frames and connected to a tiny controller to compute the range, which is incorporated in full with this reference. This range is sent via a wire or optical fiber to the switching controller located in the lens frames and analyzed to determine the correct switch setting for that object distance. Wireless optical communication involving IR transducer was mentioned in U.S. Pat. No. 7,971,994 with a data transmission across the frame's bridge thus involving the frame and, therefore, impairing frame selection, which is incorporated in full with this reference. Thus, the described focus censor was not autonomous and leaving a question of remote calibration/adjustment open.

It may also important to include a mean of remotely programming the electronic system placed at the dynamic lens. Such effective communication with autonomous components at the dynamic eyewear lens is the integral part of an effective frame independent dynamic lens operation which has to be addressed as well and is part of this invention disclosure.

SUMMARY OF THE INVENTION

Housed in the spectacle frame a presbyopia correcting dynamic lens fabricated from the dynamic lens blank which, in accordance with the present invention, is shaped similar to lens blank (standard semi-finished lens) with convex optically finished front surface of base curve shape and optically unfinished back surface. The autonomous components, i.e. components required for the dynamic lens focus adjustment, are placed within the dynamic lens without a connection to a spectacle frame structure, together with dynamic lens element (focus adjustable element) are imbedded into the dynamic lens blank. The dynamic lens undergoes dynamic lens fabrication and dispensing processes from the dynamic lens blank that match those of a conventional single focus lens fabrication and dispensing from the lens blank such as base curve selection to best suited optical and mechanical characteristics followed by back surface surfacing for the wearer's refractive correction then surface coating and edging for the lens placement into a selected by the wearer spectacle frame.

Dynamic lens blank in accordance to the present invention may consist of at least three elements: (1) lens blank with convex optically finished front surface and optically unfinished back surface, (2) autonomous components involved in the dynamic lens operation including focus sensor, control electronics with microprocessor and power unit to power the dynamic lens operation, and the dynamic lens element itself responsible for the focus adjustment, (3) insert blank for imbedding the dynamic lens autonomous components and dynamic lens element within it. Insert blank together with embedded autonomous components and dynamic lens element form the insert (focus adjustable insert) which is placed over the front surface of the lens blank.

All three elements are assembled together to form dynamic lens blank. Thus, the insert is placed anteriorly and the standard lens blank posteriorly with unfinished back surface of the resulted dynamic lens blank remains to be finished at the optic lab. The front surface of the insert may have, but no necessary, equivalement optical power as the front surface of the standard lens blank of the assembly thus allowing the utilization the same posterior surfacing according to the refractive surface shaping procedure used for the standard lens blank of the equivalent base curve. Back surface shape of the insert closely matches a shape of the base curve of the conventional lens blank for easy assembly by optical gluing, for instance. The front surface of the insert may also be aspherized to improve the peripheral vision and the wearer's expansion of a field of clear vision, and also for a reduction of dynamic lens thickness.

The autonomous components are distributed over the eyewear dynamic lens where non-transparent components such as power unit (photocell, possible rechargeable battery) and control electronics with microprocessor are placed largely at the temporal side of the dynamic eyewear lens to avoid an interference with vision. The dynamic lens element itself is placed at the visual axis within the dynamic lens for the focus adjustment. A small non-transparent component may also be placed at the nasal side of the dynamic eyewear lens for a minimum interference with the vision.

According to the present invention, the autonomous components may also include mini IR LED for remote data communication on a status/specification of the dynamic lens element operation (specifically, focus sensor operation) and IR photodiode for component's microprocessor remote programming for the most efficacious dynamic lens operation for a selected by the wearer frame design and the individual wearer's anatomy of face, eye shape, and eyelid movement. In according to the present invention, the dynamic lens element operation remote recording and specifically focus sensor operation remote recording as well as the microprocessor remote programming for the optimum dynamic eyewear lens operation are performed by the external instrument which includes gaze tracking function for synchronizing gaze with the corresponding focus sensor signal.

According to the present invention, the lens imbedded IR photodiode is also used for a manual control of a dynamic lens focus, for instance, far or intermediate or near nonadjustable focus mode, switching to adjustable focus mode. The manual control is conducted by the certain interruption of IR light flux that reaches the IR photodiode by a hand or finger. An interruption timing might be short or long, different number of interruptions or their length of time per the programmed coding to allow the wearer to manually control different modes of dynamic lens operation.

Left and right dynamic lenses may communicate with each other by near field communication (NFC) where each dynamic lens can be both a "master" (emitter or reader) and a "slave" (tag). The antennas of the reader and tag are coupled via an electromagnetic field where antennas are formed by the transparent conducting coating at each dynamic lens. The antenna is prefabricated into the dynamic lens blank, say at the peripheral annulus of an external or internal surface of the dynamic lens blank. The NFC can be used for communication on a mode of operation or just focus adjustment synchronization between left and right dynamic lenses.

An exemplary embodiment of a frame independent focus adjustable eyewear lens blank includes an autonomous components assembly. The lens blank includes a front optically finished convex surface and a back unfinished surface. A first and second space are formed in the lens blank between the front and back surfaces. The autonomous components assembly includes a focus sensor configured to detect a need for near and/or far focus and a control electronics having a microprocessor and a power unit. The power unit includes a battery and/or a photocell. A focus adjustable element is configured to change a focus viewed through the lens blank where the focus adjustable element is in communication with the focus sensor and the control electronics. The focus sensor, control electronics and power unit are disposed within the first space the focus adjustable element is disposed within the second space.

The focus adjustable element may be a fluid filled lens with a surface based switching design configured to change a foci by controlling a change in a surface shape of the fluid filled lens. The focus switching may be the result of surface shape modification a diffractive surface shape of one optical power and a refractive continuous surface shape of a different optical power.

The focus adjustable element may include a material with a refractive index change controlled by an electric or a magnetic field.

The focus adjustable element may include a material based switching design where foci switching is the result of material refractive index modification that switches the focus adjustable element between refractive and diffractive optical states.

The focus sensor and/or the control electronics may be located near a periphery of the lens blank at either a temporal or a nasal side.

The focus adjustable element may comprise a first and a second focus adjustable element, wherein at least a portion of the first focus adjustment element overlaps at least a portion of the second focus adjustment.

The focus sensor may be a first focus sensor and including a second focus sensor configured to detect the need for near and/or far focus, where the second focus sensor may be in communication with the control electronics, wherein the second focus sensor may be located at either a temporal or a nasal side which is opposite of the location of the first focus sensor. The first focus sensor may be an IR emitter and the second focus sensor may be an IR sensor.

An infrared light emitting diode may be in communication with the control electronics. Then, an infrared photodiode may be in communication with the control electronics, the infrared photodiode configured to detect a change in the amount of light emitted by the infrared light emitting diode.

In another exemplary embodiment a frame independent focus adjustable eyewear lens blank includes a conventional lens blank comprising a front optically finished convex surface and a back unfinished surface. An insert blank comprises a front convex surface of a base curve and a posterior concave surface. A first space is formed in the insert blank between the front and back surfaces and a second space is formed in the insert blank between the front and back surfaces. The conventional lens blank is disposed posterior to the insert blank, the front optically finished convex surface of the conventional lens disposed adjacent to the posterior concave surface of the insert blank. An autonomous components assembly comprises a focus sensor configured to detect a need for near and/or far focus and a control electronics having a microprocessor and a power unit. The power unit includes a battery and/or a photocell. A focus adjustable element is configured to change a focus viewed through the conventional and insert blank, the focus adjustable element in communication with the focus sensor and the control electronics. The focus sensor and control electronics are disposed within the first space and thereby imbedded in the insert blank. Similarly, the focus adjustable element is disposed within the second space and thereby also imbedded in the insert blank.

A method of manufacturing a frame independent focus adjustable eyewear lens includes the steps of optimization of the frame independent focus adjustable eyewear lens for a wearer, the steps further comprising: gaze tracking of a wearer's eye wearing the spectacle frame including straight ahead gaze tracking and down gaze tracking by the focus adjustable eyewear lens; emitting an infra-red light by the IR LED embedded into the focus adjustable eyewear lens where the infra-red light carries the information on a focus sensor signal at an eye gaze that includes straight ahead gaze and down gaze, called focus sensor information; collecting the infra-red light emitted by IR LED by a remote Optical Communication Unit and converting the infra-red light into electrical signal corresponding to the focus sensor information; processing the electrical signal corresponding to the focus sensor information by an Optical Communication Unit microprocessor to establish a range of focus sensor signals corresponding to the straight ahead gaze and another range of focus sensor signals corresponding to the down gaze, called operating ranges information; converting the operating ranges information into another infra-red light for remote communication with an IR photodiode embedded into the focus adjustable lens for IR photodiode electrical signal consecutive communication with a microprocessor embedded into the focus adjustable lens; the microprocessor sets the focus adjustable lens to far focus for the range of focus sensor signals corresponding to the straight ahead gaze and near focus for the range of focus sensor signals corresponding to the down gaze.

A method of operation optimization of focus adjustable lenses includes: simultaneous both eyes gaze tracking that includes far object eyes convergence and near object eyes convergence through both focus adjustable lenses placed at selected by the wearer spectacle frame; emitting infra-red light by IR LEDs each embedded into both focus adjustable lenses where the infra-red light carries the information on a focus sensor signal at both eyes gaze that includes far object eyes convergence and near object eyes convergence, called focus sensors information; collecting the infra-red light emitted by IR LEDs by a remote Optical Communication Unit and converting the infra-red light into electrical signal corresponding to the focus sensors information; processing the electrical signal corresponding to the focus sensors information by an Optical Communication Unit microprocessor to establish a range of focus sensors signals corresponding to the far object eyes convergence and another range of focus sensors signals corresponding to the near object eyes convergence, called operating ranges information; converting the operating ranges information into another infra-red light for remote communication with IR photodiodes each embedded into both focus adjustable lenses for IR photodiodes electrical signal consecutive communication with microprocessors embedded into the focus adjustable lenses; the microprocessors set the focus adjustable lenses to far focus for the range of focus sensors signals corresponding to the far object eyes convergence and near focus for the range of focus sensors signals corresponding to the near object eyes convergence.

Features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention on the example of the surface based switchable lens disclosed in the U.S. Pat. No. 9,364,319 where autonomous components such as sensors, control electronics, power unit and activation unit are placed at nasal and temporal locations for the illustration and is fully applicable to other designs of frame independent dynamic eyewear lens. In such drawings.

DETAILED DESCRIPTION OF THE PREFERRED EMBODIMENTS

Figure 1:
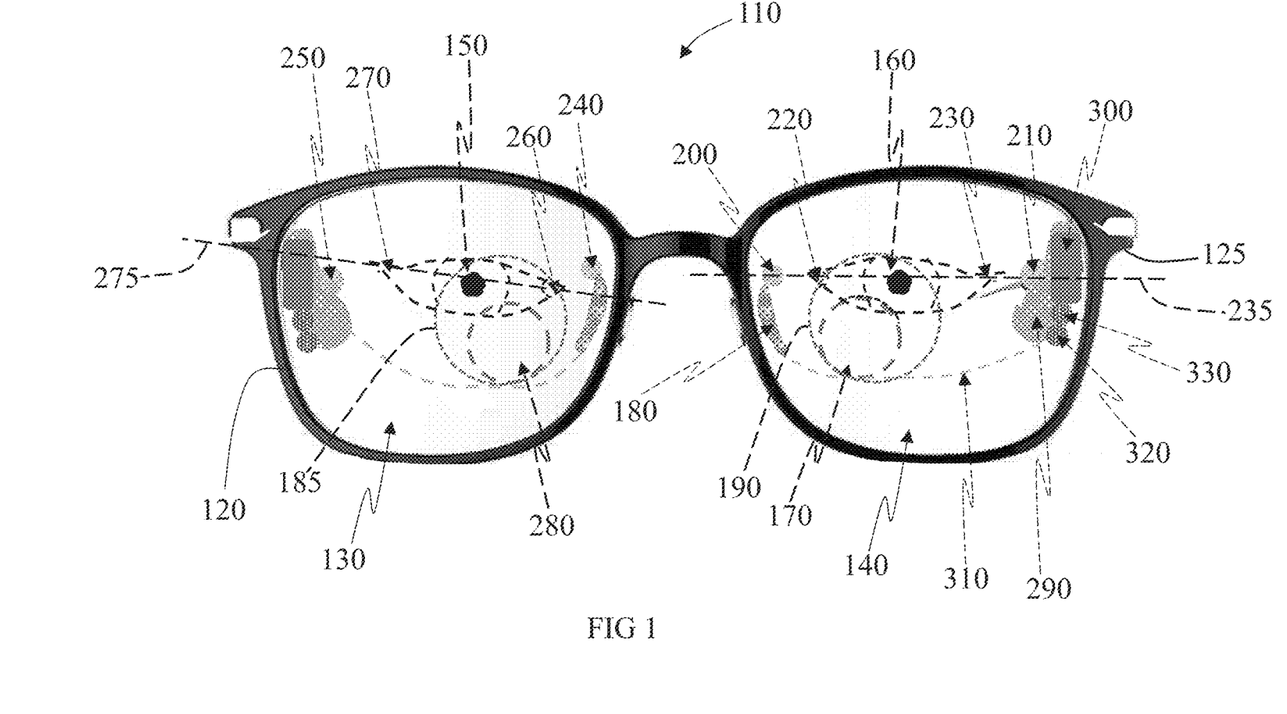
FIG. 1 shows the front view of the dynamic spectacles on the example of surface based switchable lens together with the depiction of the wearer's eyes locations in reference to the dynamic lenses.

FIG. 1 shows the front view of the dynamic spectacles 110 with frame independent focus adjustable right lens 130 and left lens 140 placed into the frame 120. FIG. 1 includes also a depiction of the right eye 150 and left eye 160 in reference to the corresponding lenses 130 and 140. The eyes 150 and 160 illustrate a straight ahead gaze for far focus. The lenses 130 and 140 are to provide correction for far focus and include the focus adjustable element 280 for near focus at the right lens 130 and focus adjustable element 170 for near focus at the left lens 140. The shape of the elements 280 and 170 can be oval or rounded of about 15 mm diameter to provide wide field of view with down gaze for near focus. The elements 280 and 170 are placed slightly closer to each other then the pupillary distance between the eyes 150 and 160 at far gaze condition to take into account their near convergence where a near object is viewed at the near point of convergence which is the point of intersection of the lines of sight of the eyes when focus on the near object. It is desirable to have automatic focus adjustment between far and near foci via a focus sensor as described in a prior art, for instance the U.S. Pat. No. 8,608,800. The dynamic lenses 130 and 140 may also include focus adjustable elements 185 and 190 correspondently for intermediate focus adjustment. Activation of elements 185 and 190 to intermediate focus converts the spectacles 110 into occupational mode of operation where focus adjustment occurs between intermediate and near foci. This is commonly used in occupation involving computer screen. A diameters of elements 185 and 190 might be similar to one of the elements 280 and 170 or larger to include elements 280 and 170 correspondently. The field of view in the intermediate focus is to cover a common computer screen viewing of, say, 50 cm diagonal. The near focus in the occupational mode of operation might be different than the nominal mode of operation where the focus adjustment occurs between far and near foci. The activation of the elements 185 and 190 can be performed manually (an example of manual operation is described below). Deactivation of elements 185 and 190 back to far focus converts the dynamic spectacles 110 into the nominal mode of operation for focus adjustment between far and near foci.

Focus adjustable element of an embodiment of the present invention may be of any principle of operation described in the present "background of the invention" section and the detailed description will continue on the example of the surface based switchable element as the basic components such as focus sensor, control electronics and power source are involved in all different principles of operation. The difference arises in the activation of a focus adjustable element which depends on the particular focus adjustable element principle of operation. Due to mirror symmetry between lenses 130 and 140, a description of the components will apply only to left lens 140. Thus, FIG. 1 illustrates the placement of control electronics and power unit 290 at the temporal area of the lens 140, i.e. close to end piece (lug) 125 of the frame 120, approximately within common lens effective diameter (ED) of 50-60 mm. Power unit may include battery, particular rechargeable battery that collects energy from the photocell 300. Control electronics and power unit 290 drives other components of the lens 140 via connecting wire 310. It could drive directly a focus adjustable element or a separate activation component such as 180 in case of surface based switchable element. Small component that are not light transparent can be also placed at the nasal location, for instance, activation component 180.

Different types of focus sensor can be applied in the present invention. FIG. 1 references to the focus sensor couple 200 and 210 at the left lens and also 240 and 250 at the right lens as described in the U.S. Pat. No. 8,608,800 where one component of the focus sensor couple is IR emitter and another IR sensor to collect the IR reflection change off the eye's front surface between straight ahead gaze of far focus and down gaze of near focus. Reflecting off the eye IR flux depends of the eye's orientation and shape. For instance, right eye 150 and left eye 160 illustrate different orientations where a line 235 drawn through the lacrimal caruncle 220 and lateral canthus 230 has almost horizontal orientation and the line 235 passes through the focus sensor couple 200 and 210. A line 275 drawn through lacrimal caruncle 260 and lateral canthus 270 has a different orientation and does not pass through the focus sensor couple 240 and 250 which may result in a different IR reflection change off the eye between straight ahead and down gazes of the right eye 150 and left eye 160. System programming for the optimum focus adjustment operation is important due to such differences in eye orientations and shapes which will be illustrated at the FIG. 6. For this purpose of programming, two additional components are shown on the FIG. 1 which are IR LED 330 and IR photodiode 320 imbedded at the left lens 140 and facing out from the left eye 160 with equivalent components are embedded at the right lens 130.

The lens imbedded photodiode is also used for a manual control of the focus adjustment, for instance, setting non-adjustable far or intermediate or near focus mode and switching back to the focus adjustable mode. The manual control is conducted by the specific interruption the light flux that reaches the photodiode 320 by a hand or finger. For instance, manual flux interaction of a certain sequence, say 3 times quick interruption of the light flux reaching the photodiode 320 switches the electronic control to constant nonadjustable mode of far focus; 1 time slow interruption followed by 2 times quick interruption switches the dynamic lens operation back to the automatic focus adjustable mode; 4 times quick interruption switches to the constant near focus mode; 2 times slow interruption followed by 2 times quick interruption switching to the occupational mode of operation, and so on.

Dynamic lenses 130 and 140 are originated from the dynamic lens blanks produced with a convex base curve at the front surface defined by the standard lens blank for base lens shape in terms of optical and mechanical characteristics of the historically developed lens dispensing process. The dynamic lenses 130 and 140 are produced by shaping the unfinished back surface of the dynamic lens blank and edging them for framing into the frame 120 similar to conventional process used with conventional static lenses. A dynamic lens blank can be produced directly by imbedding the dynamic lens components into the material of the dynamic lens blank during its fabrication, molding, for instance, or by assembling from several elements as illustrated by FIGS. 2 through 5.

Figure 2:
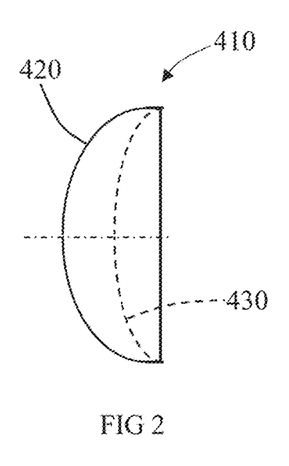
FIG. 2 illustrates a lens blank with base curve at the front surface and unfinished back surface.

FIG. 2 illustrates a standard lens blank 410 commonly used to produce static lens. It has a rounded shape of usual sizes 65, 70 and 75 mm diameters with a convex base curve 420 at the front surface as the finished optical surface. Back surface 430 is unfinished surface to be shaped into a spherocylindrical form of finished optical surface to meet eyewear prescription for the wearer's refraction correction. A set of conventional lens blanks for a given lens material of base curve and diameters is used as the base element for the dynamic (focus adjustable) lens blank described below.

In making a conventional single focus lens, a lens blank with the optimum base curve for a given prescription is selected and also with the smallest diameter for a minimum final lens thickness which results in the most cosmetically appealing and lightest final eyewear lens. Depending upon a spectacle frame, eye monocular pupil distance and pantoscopic tilt, the center of the lens might be decentered horizontally and vertically impacting the lens blank size selection which is part of the spectacles dispensing procedure. One of the embodiments of the present invention describes focus adjustable lens blank construction that fits into historically optimized processes of eyewear dispensing used for a common single focus spectacles.

Focus adjustable lens blank includes dynamic lens components as shown on the FIG. 1 including focus sensor, control electronics with microprocessor and power unit to power such dynamic lens operation together with the focus adjustable activation element itself responsible for the focus adjustment. In the example of the surface based switchable lens, FIG. 3 shows the autonomous components 490 which include component 510 that includes control electronics, power unit and one of the focus sensor couple; activation component and another of the sensor couple 520 connected by the connecting wire 530 to the components 510 and also surface based switchable element 500.

Figure 3:
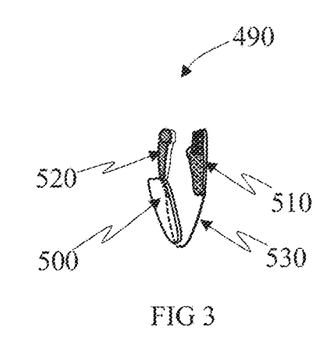
FIG. 3 illustrates the autonomous components involved in the dynamic lens operation including focus sensor, control electronics with microprocessor and power unit to power the dynamic lens operation, together with the dynamic lens element (or just element) itself responsible for the focus adjustment; (All together autonomous components and dynamic lens element are called dynamic lens components)
Figure 4:
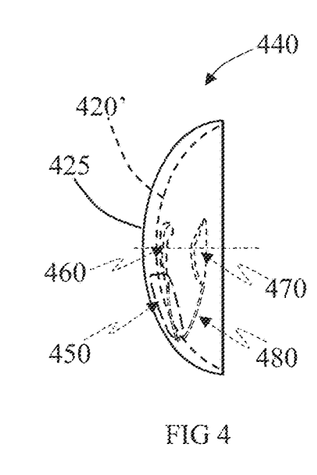
FIG. 4 illustrates the insert blank for imbedding the dynamic lens components.

FIG. 4 illustrates the lens insert blank 440 for imbedding the dynamic lens components 490 of the FIG. 3 as the example of surface based switchable lens insert. For this purpose the insert 440 includes posterior cutout spaces. For instance, as an example of the insert of surface based switching lens blank, space 470 is for embedding the control electronics, power unit and one element of the focus sensor couple referenced together as 510, space 460 is for embedding activation unit and another element of focus sensor coupe together referenced to as 520, space 480 for embedding connecting wire 530 and space 450 for embedding surface based switchable element 500. Equivalent insert blank construction is applicable to any type of lens insert of any frame independent dynamic lens blank. The embedding the components 490 into insert blank 440 forms dynamic insert or just insert.

Front surface 425 of the insert blank 440 may be optically equivalent (equivalent optical power of the surface) to base curve 420. The posterior surface 420' is closely matches the base curve 420 for ease of assembly of the insert and conventional lens blank 410. The front surface 425 may be aspherized for optical and mechanical (thickness) qualities improvement of the corresponding dynamic lens.

The insert may also include Near Field Communication components. NFC is a short-range radio technology that enables communication between devices that are held in close proximity. NFC elements are, for example, an emitter and a tag with their antennas coupled via an electromagnetic field. An alternating current passes through the emitter's primary coil and this current induces a field thru the air, inducing current in the tag's secondary coil. The tag may use the current from the field to power itself, passive tag, or powered by a battery in the active tag. The tag acting as antenna changes elective field which can be also read by the emitter acting as the reader of the data defined by the tag configuration. Antenna of the reader/tag is formed by the transparent conductive coating (TCO) on posterior and/or anterior surfaces of the insert blank 440 or anterior surface of the lens blank 410. A common substance used in transparent conductive coatings is indium tin oxide (ITO). ITO is not very optically transparent, however and the layers must be thin to provide substantial transparency, particularly at the blue end of the spectrum. Other TCOs include aluminum doped zinc oxide (AZO), for instance. NFC of the dynamic lens can be configures for lens ID, communication between left and right lenses (activation synchronization, for instance), dynamic lens programming or other functions.

Figure 5:
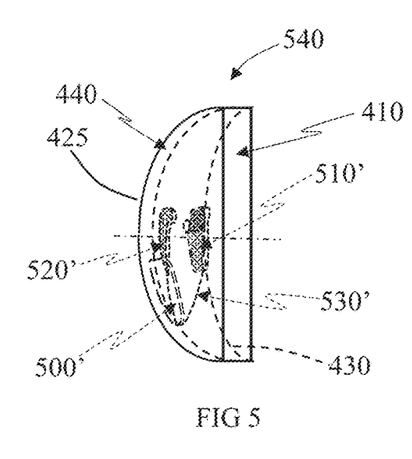
FIG. 5 shows the dynamic lens blank as the assembly of the standard lens blank, dynamic lens components and insert blank.

FIG. 5 shows the dynamic lens blank 540 on the example of surface based switchable lens blank. It is constructed as the assembly of the standard lens blank 410 posteriorly and the insert as the combination of the insert blank 440 and embedded components 490 illustrated as embedded control electronics, power unit and one of the focus sensor couple collectively referenced to as 510'; embedded activation and another of the sensor couple collectively referenced to as 520' connecting by the embedded connecting wire 530' to the components 510' and embedded dynamic element 500'. The assembly is maintained by an optical glue, for instance. The dynamic lens blank 540 maintains conventional lens blank sizing, back unfinished surface 430 and base curve 425 of the insert blank 440. Due to optical and mechanical equivalence between the dynamic lens blank 540 and corresponding conventional lens blank 410, similar fabrication and dispensing professes are utilized by the optic lab.

A component may be protruded through the front surface 425 of the dynamic lens blank 540, particularly power unit. For instance, rechargeable coin cell battery can be fairly thick, for instance, MS621 FE battery by SEIKO is 6.8 mm in diameter and 2.1 mm thick. On the other hand, solid state rechargeable battery can be much thinner, for instance, EnerChip CBC050-BDC by Cymbet corp. is 5.7 mm×6.1 mm in size and only 0.2 mm thick. The state-of-the-art of battery miniaturization based on novel Li and Li-ion two- and three-dimensional thin-film micro batteries can provide options for power unit miniaturization.

Remote programming for optimum dynamic lens operation via NFC is possible but optical communication offers simplicity and the option for manual control. Remote programming is essential in dynamic lens operation due to individual differences in eye shapes and orientations as well as manufacturing factors such as focus sensor positional variations during dynamic lens fabrication. As an embodiment of this invention is the use of optical means for remote programming for optimum focus adjustment operation via photodiode 320 and/or photocell 300 is the most economical option.

Equivalent structure of optical means for a remote programming for focus adjustment operation optimization can also be applied to focus adjustable (dynamic) contact lens of any similar operating principle. Photodiode and/or photocell at the dynamic contact lens can be applied for focus adjustment activation. Scleral or other type of contact lens moves together with eye surface between straight ahead gaze for far vision and down gaze for near vision. By placing a photocell and/or photodiode at a lower portion of the lens, a signal degenerated by the photosensitive device varies if blocked by the lower eyelid with eye down gaze for near vision and unblocked with eye straight ahead gaze for far vision to allow triggering the focus adjustment for viewing objects at different distances from the eye. Several photosensitive devices can be embedded within the contact lens to improve sensitivity to gaze change. For instance, another photosensitive device is placed across the center of the contact lens approximately at the lens opposite side, so called complimentary device, to form device couple. The complimentary device operates per the opposite action—it is exposed to light with down gaze for near object viewing and light flux is blocked by the upper eyelid with eye straight ahead gaze for far focus. A signal difference between devices in the device couple improves a sensitivity to gaze change and also addresses low light condition. The lens may include several couples of devices described above at different meridians to address an impact of the lens rotation.

Going back to the spectacle lens. Due to variations of eye shapes and orientations, there is a need for a microprocessor controlled optimization process of the focus adjustable lens operation to provide far focus with the straight ahead gaze and near focus with the down gaze. The optimization involves several processes: (1) gaze tracking of the eye to measure straight ahead or down gaze, (2) remote measurement of the focus sensor signal that controls the adjustment to far focus and near focus of the dynamic lens, and (3) remote programming of the dynamic lens microprocessor to synchronize the focus adjustment for far or near vision with focus sensor signal corresponding to straight ahead or down gaze. The processes involved in the focus adjustable lens operation optimization is the integral part of a successful operation of a frame independent dynamic lens and are part of the present invention.

Figure 6:
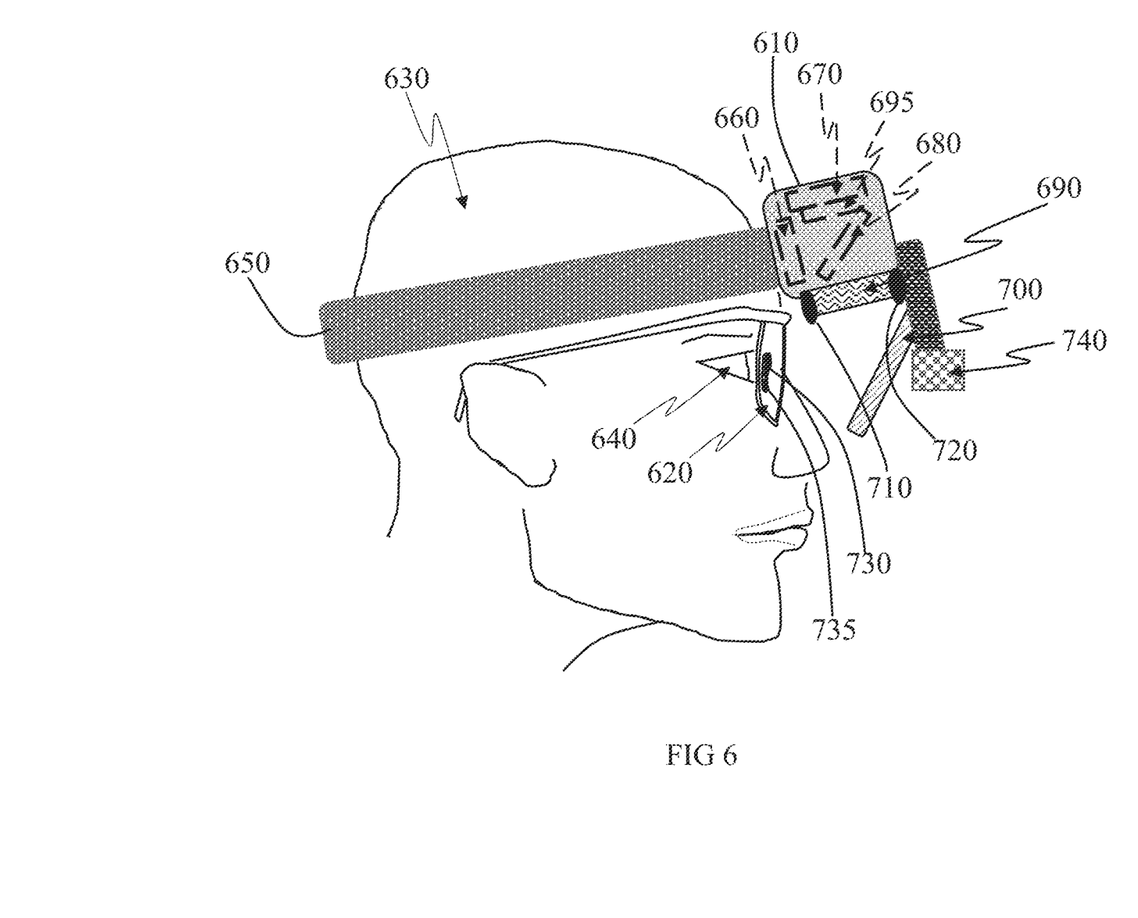
FIG. 6 illustrates the head attached external device for communication with autonomous components of the dynamic lens for calibration of the focus adjustment operation, particularly focus sensor function, and programming for the dynamic spectacles optimum performance for a given frame design by the given dynamic lens wearer.

Eye tracking or more specifically defined in this case, gaze-tracking is the measurement of gaze, so called point of regard. Gaze tracking relies on the analysis of eye tracking data with respect to the visual scene in order to report the direction of the gaze relative to the head. FIG. 6 illustrates a head-mounted system 610 of eye tracking suitable for the gaze tracking of the dynamic lens 620 wearer at the eye 640. The system 610 is mounted over the head 630 by the head strip 650. The dynamic lens 620 is manually set for far focus nonadjustable mode, i.e. the dynamic lens 620 becomes analogous to a single focus lens of the far refraction. Video-based eye tracking is the most widely used method in commercial eye trackers. For instance, video-based eye trackers work by illuminating the eye with an off-axial infrared light source 710 or additional source 720. This light produces a glint on the cornea of the eye 640 and is called corneal reflection (first Purkinje image) which is used as the reference point in the gaze calculation. It could be a different method, for instance, dual Purkinje image tracking detects the separation between the first Purkinje image and fourth Purkinje image (reflection from by the posterior surface of the eye lens). The components for the head-mounted eye tracking device 610 are LCD or other type of small display 660, display optics 690 to project image from the display 660 onto the eye 640, and beamsplitters 680 and 700 to present images created on the display 660 to the wearer of the dynamic lens 620. The straight ahead gaze is stimulated with the image projected for the eye 640 by the display optics 690 from the center of the display 660 and down gaze is stimulated with image projected from the edge of the display 660. Simultaneously with a display image projection, the eye is illuminated by one or multiple infrared LEDs 710 and 720 mounted around the display optic 700. Infrared light reflected off the eye directed by the beamsplitter 700 and collected through the display optics 690 and camera optic 695 onto the infrared camera 670 with the camera being on the conjugate plane of the pupil of the eye 640. Thus, the camera captures pupil and glint for so called pupil-glint tracking that allows to detect the vector difference between the pupil center and the corneal reflection and consecutive gaze calculation by the device microprocessor.

As shown on the FIG. 1, the dynamic lens 140 included two additional components which are IR LED 330 and IR photodiode 320. Similarly, the dynamic lens 620 included both components as well—IR LED 730 and IR Photodiode 735. Electrical signal of the focus sensor of the dynamic lens 620 is converted to the IR light signal emitted by the IR LED 730 with the help of the dynamic lens electronics and lens microprocessor. The IR light signal is collected by the Optical Communication Unit 740 for the remote measurement of the focus sensor signals (analog or digital) that controls the lens adjustment to far focus and near focus. The gaze-tracing of a gaze and remote focus signal measurement are synchronized to insure that the measured focus sensor signal corresponds to the particular eye gaze. As a result of the focus sensor signal measurements at different gaze conditions the focus sensor optimum signal range corresponding to straight ahead gaze (far vision) and signal range corresponding to down gaze (near vision) are established. The next step is to program the microprocessor of the dynamic lens 620 for the established focus sensor optimized ranges for far focus (strength ahead gaze) and near focus (down gaze). The remote programming of an embedded into the dynamic lens 620 microprocessor is performed by the Optical Communication Unit 740 through digitally modulated IR light communication with the IR photodiode 735 at the dynamic lens 620. The microprocessor then sets the focus adjustable lens 620 to far focus for the range of focus sensor signals corresponding to the straight ahead gaze and near focus for the range of focus sensor signals corresponding to the down gaze. Thus, head mounted gaze-tracking system 610 together with Optical Communication Unit 740 provide dynamic lens 610 operation optimization. As another option, Gaze-tracking and Optical Communication Unit may be mounted on a Slit-Lamp which is a common instrument in an optometric office.

A measurement of focus sensors signals in both eyes simultaneously offers an option to establish a condition for dynamic lens adjustment to far focus or near focus using eyes convergence which is the simultaneous inward movement of both eyes toward each other in an effort to maintain single binocular vision when viewing an intermediate or near object. In this case, the system described in FIG. 6 is expanded to binocular operation where both eyes are presented the images to stimulate absence of convergence in far focus and a convergence corresponding to near focus. Gazes of both eyes are measured simultaneously and the focus sensor signals of both eyes are measures remotely via infra-red light emitted by IR LEDs in both dynamic lenses. Similar to the explanation by the FIG. 6, the infra-red light is collected by the Optical Communication Unit, binocular operation in this case, and the corresponding signals are processed by its microprocessor to establish focus sensor ranges at each eye such as a small range of convergence is defined as far focus and a certain range of convergence is defined as a near focus. The microprocessors of both dynamic lenses are then remotely programmed by the emitted by the Optical Communication Unit infra-red light via IR photodiodes embedded at both dynamic lenses. The microprocessors then set the focus adjustable lenses to far focus for the range of focus sensors signals corresponding to the far object eyes convergence and near focus for the range of focus sensors signals corresponding to the near object eyes convergence

What is claimed is:

1. A frame independent focus adjustable eyewear lens blank, comprising:
    a front optically finished convex surface;

a back unfinished surface;
a first space formed in the lens blank between the front and back surfaces; and
a second space formed in the lens blank between the front and back surfaces;
an autonomous components assembly comprising:
   a focus sensor configured to detect a need for near and/or far focus;
   a control electronics having a microprocessor and a power unit, wherein
   the power unit includes a battery and/or a photocell;
   a focus adjustable element configured to change a focus viewed through a lens produced from the lens blank, the focus adjustable element in communication with the focus sensor and the control electronics;
   wherein the focus sensor, control electronics and power unit are disposed within the first space and thereby imbedded in the lens blank; and
   wherein the focus adjustable element is disposed within the second space and thereby imbedded in the lens blank.

2. The frame independent focus adjustable eyewear lens blank of claim 1, wherein the focus adjustable element is a fluid filled lens with a surface based switching design configured to change a foci by controlling a change in a surface shape of the fluid filled lens.

3. The frame independent focus adjustable eyewear lens blank of claim 2, wherein the focus switching is the result of surface shape modification a diffractive surface shape of one optical power and a refractive continuous surface shape of a different optical power.

4. The frame independent focus adjustable eyewear lens blank of claim 1, wherein the focus adjustable element includes a material with a refractive index change controlled by an electric or a magnetic field.

5. The frame independent focus adjustable eyewear lens blank of claim 1, wherein the focus adjustable element includes a material based switching design where foci switching is the result of material refractive index modification that switches the focus adjustable element between refractive and diffractive optical states.

6. The frame independent focus adjustable eyewear lens blank of claim 1, wherein the focus sensor and/or the control electronics are located near a periphery of the lens blank at either a temporal or a nasal side.

7. The frame independent focus adjustable eyewear lens blank of claim 1, wherein the focus adjustable element comprises a first and a second focus adjustable element, wherein at least a portion of the first focus adjustment element overlaps at least a portion of the second focus adjustment.

8. The frame independent focus adjustable eyewear lens blank of claim 1, including an infrared light emitting diode in communication with the focus sensor, the infrared light emitted diode configured to detect a change in signal of the focus sensor.

9. The frame independent focus adjustable eyewear lens blank of claim 1, including an infrared photodiode in communication with the control electronics, the infrared photodiode configured to deliver a signal to the microprocessor.

10. A frame independent focus adjustable eyewear lens blank, comprising:
a conventional lens blank comprising:
   a front optically finished convex surface; and
   a back unfinished surface;
an insert blank comprising:
   a front convex surface of a base curve; and
   a posterior concave surface;
   a first space formed in the insert blank between the front and back surfaces; and
   a second space formed in the insert blank between the front and back surfaces;
   wherein the conventional lens blank is disposed posterior to the insert blank, the front optically finished convex surface of the conventional lens disposed adjacent to the posterior concave surface of the insert blank;
an autonomous components assembly comprising:
   a focus sensor configured to detect a need for near and/or far focus;
   a control electronics having a microprocessor and a power unit, wherein the power unit includes a battery and/or a photocell;
   a focus adjustable element configured to change a focus viewed through a lens produced from the lens blank, the focus adjustable element in communication with the focus sensor and the control electronics;
   wherein the focus sensor and control electronics are disposed within the first space and thereby imbedded in the insert blank; and
   wherein the focus adjustable element is disposed within the second space and thereby imbedded in the insert blank.

11. The frame independent focus adjustable eyewear lens blank of claim 10, wherein the focus adjustable element is a fluid filled lens with a surface based switching design configured to change a foci by controlling a change in a surface shape of the fluid filled lens.

12. The frame independent focus adjustable eyewear lens blank of claim 11, wherein the focus switching is the result of surface shape modification a diffractive surface shape of one optical power and a refractive continuous surface shape of a different optical power.

13. The frame independent focus adjustable eyewear lens blank of claim 10, wherein the focus adjustable element includes a material with a refractive index change controlled by an electric or a magnetic field.

14. The frame independent focus adjustable eyewear lens blank of claim 10, wherein the focus adjustable element includes a material based switching design where foci switching is the result of material refractive index modification that switches the focus adjustable element between refractive and diffractive optical states.

15. The frame independent focus adjustable eyewear lens blank of claim 10, wherein the focus sensor and/or the control electronics are located near a periphery of the insert blank at either a temporal or a nasal side.

16. The frame independent focus adjustable eyewear lens blank of claim 10, wherein the focus adjustable element comprises a first and a second focus adjustable element, wherein at least a portion of the first focus adjustment element overlaps at least a portion of the second focus adjustment.

17. The frame independent focus adjustable eyewear lens blank of claim 10, including an infrared light emitting diode in communication with the focus sensor, the infrared light emitted diode configured to detect a change in signal of the focus sensor.

18. The frame independent focus adjustable eyewear lens blank of claim 10, including an infrared photodiode in communication with the control electronics, the infrared photodiode configured to deliver a signal to the microprocessor.

19. A method of manufacturing a frame independent focus adjustable eyewear lens blank, the method comprising the steps of:
- providing a lens blank comprising:
  - a front optically finished convex surface;
  - a back unfinished surface;
  - a first space formed in the lens blank between the front and back surfaces; and
  - a second space formed in the lens blank between the front and back surfaces;
- providing an autonomous components assembly comprising:
  - a focus sensor configured to detect a need for near and/or far focus;
  - a control electronics having a microprocessor and a power unit, wherein the power unit includes a battery and/or a photocell;
- providing a focus adjustable element configured to change a focus viewed through the lens blank, the focus adjustable element in communication with the focus sensor and the control electronics;
- disposing the focus sensor and control electronics within the first space thereby imbedded within the lens blank; and
- disposing the focus adjustable element within the second space thereby imbedded in the lens blank.

20. The method of manufacturing a frame independent focus adjustable eyewear lens blank of claim 19, including the step of transforming the lens blank into a lens by shaping the back unfinished surface to a refractive prescription and by edging an outer perimeter of the lens blank for placement into a spectacle frame.

* * * * *